United States Patent
Yokomura et al.

(10) Patent No.: US 11,498,635 B2
(45) Date of Patent: Nov. 15, 2022

(54) FUEL TANK STRUCTURE

(71) Applicant: HONDA MOTOR CO., LTD., Tokyo (JP)

(72) Inventors: Hikaru Yokomura, Wako (JP); Atsushi Yamada, Wako (JP); Keigo Mine, Wako (JP); Tasuku Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 16/644,796

(22) PCT Filed: Sep. 3, 2018

(86) PCT No.: PCT/JP2018/032591
§ 371 (c)(1),
(2) Date: Mar. 5, 2020

(87) PCT Pub. No.: WO2019/054223
PCT Pub. Date: Mar. 21, 2019

(65) Prior Publication Data
US 2021/0061393 A1   Mar. 4, 2021

(30) Foreign Application Priority Data
Sep. 14, 2017   (JP) .............................. JP2017-176550

(51) Int. Cl.
*B62J 35/00* (2006.01)
*B62J 37/00* (2006.01)
(Continued)

(52) U.S. Cl.
CPC .............. *B62J 35/00* (2013.01); *B62J 37/00* (2013.01); *B60K 15/0406* (2013.01); *B60K 15/05* (2013.01); *B60Y 2200/12* (2013.01)

(58) Field of Classification Search
CPC ....... B62J 35/00; B62J 37/00; B60K 15/0406; B60K 15/05; B60Y 2200/12
(Continued)

(56) References Cited

U.S. PATENT DOCUMENTS

2008/0083457 A1* 4/2008 Konshak ................. F16K 17/36
  137/39
2010/0051369 A1* 3/2010 Kuramochi .............. B62J 35/00
  123/519

FOREIGN PATENT DOCUMENTS

JP   59-175049   1/1984
JP   59-179792   12/1984
(Continued)

OTHER PUBLICATIONS

International Preliminary Report on Patentability issued in international application No. PCT/JP2018/032591, 10 pages.
(Continued)

*Primary Examiner* — Mahmoud Gimie
(74) *Attorney, Agent, or Firm* — Rankin, Hill & Clark LLP

(57) ABSTRACT

A fuel tank structure that makes it difficult for mud, water, dust or the like to enter a fuel tank and that can restrict a fuel leakage path when a vehicle falls. A fuel cap includes a cap body mounted to a fuel supply port of a fuel tank, and a pressure adjusting device provided in the cap body to adjust a pressure in the fuel tank. In the fuel cap, a space is formed as a hermetically closed space in which the pressure adjusting device is accommodated, and the space communicates with an exterior of the fuel tank via a breather tube.

3 Claims, 4 Drawing Sheets

(51) Int. Cl.
  *B60K 15/04* (2006.01)
  *B60K 15/05* (2006.01)
(58) Field of Classification Search
  USPC .......................................................... 280/835
  See application file for complete search history.

(56) References Cited

FOREIGN PATENT DOCUMENTS

| JP | 2006123666 A | * | 5/2006 | | |
|----|--------------|---|--------|---|---|
| JP | 5630420 | | 11/2014 | | |
| JP | 2016068715 A | * | 5/2016 | .............. | B62J 35/00 |

OTHER PUBLICATIONS

International Search Report, dated Nov. 20, 2018 (Nov. 20, 2018), 3 pages.
Written Opinion dated Nov. 20, 2018, 5 pages.

* cited by examiner

FUEL TANK STRUCTURE

TECHNICAL FIELD

The present invention relates to a fuel tank structure.

BACKGROUND ART

Heretofore, as a fuel cap that closes a fuel supply port of a fuel tank, there has been known a fuel cap comprising a pressure adjusting valve that adjusts a pressure in the fuel tank (e.g., see Patent Literature 1).

CITATION LIST

Patent Literature

Patent Literature 1: Japanese Patent No. 5630420

SUMMARY OF INVENTION

Technical Problem

Patent Literature 1 discloses a structure that an evaporative fuel inside a fuel tank exits and air outside the fuel tank enters through a space provided with a pressure adjusting valve in a cap body of a fuel cap, holes of an outer torque mechanism and a gap between the torque mechanism and a lid body. Consequently, in a case where the fuel tank is attached to a vehicle body in an uncovered manner as in a motorcycle, mud, water, dust or the like easily enters the fuel tank. There is also a problem that a leakage region of the fuel in the fuel tank broadens when the vehicle falls.

It is an object of the present invention to provide a fuel tank structure that makes it difficult for mud, water, dust or the like to enter a fuel tank and that can restrict a fuel leakage path when a vehicle falls.

Solution to Problem

The entire content of Japanese Patent Application No. 2017-176550 filed in Sep. 14, 2017 is incorporated herein.

According to the present invention, provided is a fuel tank structure comprising, in a fuel cap (92), a cap body (111) mounted to a fuel supply port (91) of a fuel tank (31), and a pressure adjusting device (117) provided in the cap body (111) to adjust a pressure in the fuel tank (31), wherein in the fuel cap (92), a hermetically closed space (124a) in which the pressure adjusting device (117) is accommodated is formed, and the hermetically closed space (124a) communicates with an exterior of the fuel tank (31) via a breather tube (101).

In the above invention, the breather tube (101) may have an open end inserted in a stem pipe (99).

Furthermore, in the above invention, the cap body (111) and a retainer (113) attached to the cap body (111) may form a housing (124), the hermetically closed space (124a) may be formed in the housing (124), the breather tube (101) may be connected directly to the retainer (113), and a space between the retainer (113) and the cap body (111) may be sealed.

Additionally, in the above invention, a cap outer (116) may be fitted in and thereby attached to an outer side of the cap body (111), a fuel tray (106) may be provided around the fuel supply port (91) of the fuel tank (31), a tray peripheral wall (106a) may be formed in the fuel tray (106) to surround the fuel supply port (91), and a dust seal portion (106b) extending radially outward from the tray peripheral wall (106a) may be fitted in an inner peripheral surface of an outer peripheral wall (116e) formed in the cap outer (116).

Furthermore, in the above invention, the fuel tank (31) may comprise a tank cover (94) that covers a periphery of the fuel supply port (91), a cylindrical portion (94a) in which the outer peripheral wall (116e) of the cap outer (116) is inserted may be formed in the tank cover (94), the cylindrical portion (94a) may be formed on a radially inner side of an outermost peripheral portion (116f) of the cap outer (116), and a lower edge of the outermost peripheral portion (116f) of the cap outer (116) may be located below an upper edge of the cylindrical portion (94a).

Advantageous Effects of Invention

According to the present invention, in a fuel cap, a hermetically closed space in which a pressure adjusting device is accommodated is formed, and the hermetically closed space communicates with an exterior of a fuel tank via a breather tube. Consequently, a gas can exit and enter the fuel tank only through the breather tube to adjust a pressure in the fuel tank. This can make it difficult for mud, water, dust or the like to enter the fuel tank, and can restrict a fuel leakage path when a vehicle falls.

Furthermore, in the above invention, the breather tube has an open end inserted in a stem pipe. This can further inhibit the mud, water, dust or the like from entering the fuel tank, and can further restrict the fuel leakage path when the vehicle falls.

Additionally, in the above invention, the cap body and a retainer attached to the cap body form a housing, the hermetically closed space is formed in the housing, the breather tube is connected directly to the retainer, and a space between the retainer and the cap body is sealed. Consequently, the space between the retainer and the cap body is sealed, so that an interior of the housing can be easily formed as the hermetically closed space, and gas leakage from the housing itself to the exterior of the fuel tank can be prevented.

Furthermore, in the above invention, a fuel tray is provided around the fuel supply port of the fuel tank, a tray peripheral wall is formed in the fuel tray to surround the fuel supply port, and a dust seal portion extending radially outward from the tray peripheral wall is fitted in an inner peripheral surface of an outer peripheral wall formed in a cap outer. Consequently, the dust seal portion of the fuel tray is fitted in the outer peripheral wall of the cap outer, so that it can be difficult for the mud, water, dust or the like to enter the fuel tank.

Additionally, in the above invention, the fuel tank comprises a tank cover that covers a periphery of the fuel supply port, a cylindrical portion in which the outer peripheral wall of the cap outer is inserted is formed in the tank cover, the cylindrical portion is formed on a radially inner side of an outermost peripheral portion of the cap outer, and a lower edge of the outermost peripheral portion of the cap outer is located below an upper edge of the cylindrical portion. Therefore, the outermost peripheral portion of the cap outer and the cylindrical portion of the tank cover can form a labyrinth structure. Consequently, it is possible to prevent permeation of the mud, water, dust or the like into the fuel cap, and it is possible to make it difficult for the mud, water, dust or the like to enter the fuel tank during opening/closing of the fuel cap.

DESCRIPTION OF EMBODIMENTS

Hereinafter, an embodiment of the present invention will be described with reference to the drawings. Note that in the description, front, rear, left, right, upward and downward directions are the same as directions to a vehicle body unless otherwise stated. Furthermore, reference sign FR shown in the respective drawings indicates a front of the vehicle body, reference sign UP indicates an upside of the vehicle body, and reference sign LH indicates a left of the vehicle body.

Figure 1:
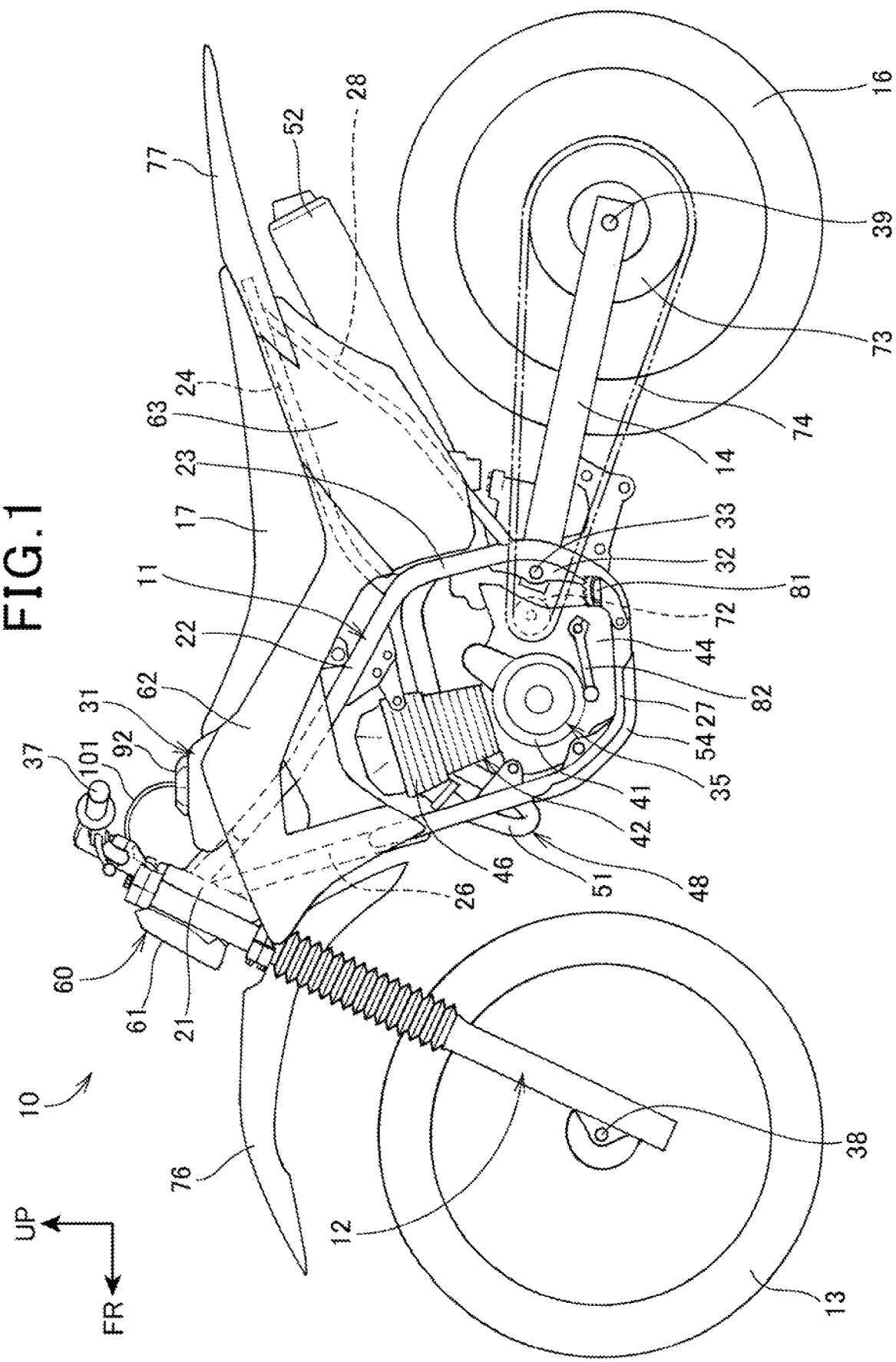
FIG. 1 is a left side view showing a motorcycle comprising a fuel tank structure according to the present invention.

FIG. 1 is a left side view showing a motorcycle 10 comprising a fuel tank structure according to the present invention.

The motorcycle 10 comprises a front wheel 13 supported at a front end of a body frame 11 via a front fork 12, a rear wheel 16 supported at a lower rear part of the body frame 11 via a swing arm 14, and a seat 17 supported above the body frame 11. Thus, the motorcycle 10 is such a saddle vehicle that a rider rides across the seat 17.

The body frame 11 comprises a head pipe 21, a main frame 22, a pair of right and left center frames 23, a pair of right and left seat frames 24, a down frame 26, a pair of right and left lower frames 27, and a pair of right and left sub frames 28.

The head pipe 21 forms a front end of the body frame 11, and steerably supports the front fork 12. The main frame 22 extends diagonally downward and rearward from an upper portion of the head pipe 21, separates to right and left and further extends diagonally downward and rearward, to support a fuel tank 31 disposed in front of the seat 17. The center frame 23 integrally extends downward from a rear end of the main frame 22. Pivot plates 32 are attached to the pair of right and left center frames 23, respectively, and a pivot shaft 33 that swingably supports a front end of the swing arm 14 is provided across the right and left pivot plates 32.

The right and left seat frames 24 extend diagonally upward and rearward from rear ends of the right and left main frames 22, respectively, to support the seat 17. The down frame 26 extends diagonally downward and rearward from an underside of the head pipe 21 below the right and left main frames 22. The right and left lower frames 27 extend downward and laterally from a lower end of the down frame 26, and further extend rearward to be connected to lower ends of the right and left center frames 23, respectively. The right and left sub frames 28 are connected to the right and left center frames 23 and the right and left seat frames 24, respectively.

An engine 35 is supported by the right and left center frames 23, the down frame 26 and the right and left lower frames 27.

The front fork 12 supports a bar handle 37 at an upper end of the fork, and supports the front wheel 13 via a front axle 38 at a lower end of the fork. The swing arm 14 supports the rear wheel 16 via a rear axle 39 at a rear end of the arm.

The engine 35 comprises a crankcase 41, and a cylinder part 42 raised from an upper front part of the crankcase 41.

A transmission 44 is provided integrally with a rear part of the crankcase 41.

The cylinder part 42 comprises a cylinder head 46. An intake device (not shown) is connected to a rear part of the cylinder head 46, and an exhaust device 48 is connected to a front part of the cylinder head 46. The exhaust device 48 comprises an exhaust tube 51 connected to the cylinder head 46, and a muffler 52 connected to a rear end of the exhaust tube 51.

In a lower front of a vehicle body, there is provided an engine guard 54 that covers the engine 35, the right and left lower frames 27 and others from the lower front.

The body frame 11 is covered with a body cover 60.

The body cover 60 is constituted of a front cover 61, a pair of right and left shrouds 62, and a pair of right and left side covers 63.

The front cover 61 is attached to the front fork 12 via a stay (not shown), and covers an upper part of the front fork 12 from front. The shrouds 62 cover front parts of the main frames 22, front parts of seat frames 24 and an upper part of the down frame 26 from sides. The side covers 63 cover rear parts of the seat frames 24 and rear parts of the sub frames 28 from sides.

A drive sprocket 72 is attached to an output shaft of the transmission 44, and a driven sprocket 73 is attached to the rear wheel 16. A chain 74 is hung over the drive sprocket 72 and the driven sprocket 73, and a power is transmitted from the transmission 44 to the rear wheel 16.

The front wheel 13 is covered with a front fender 76 from above. The rear wheel 16 is covered with a rear fender 77 from above. A step 81 for a rider is provided at the lower end of the center frame 23. A gear change pedal 82 is disposed close to the step 81 for the rider.

Figure 2:
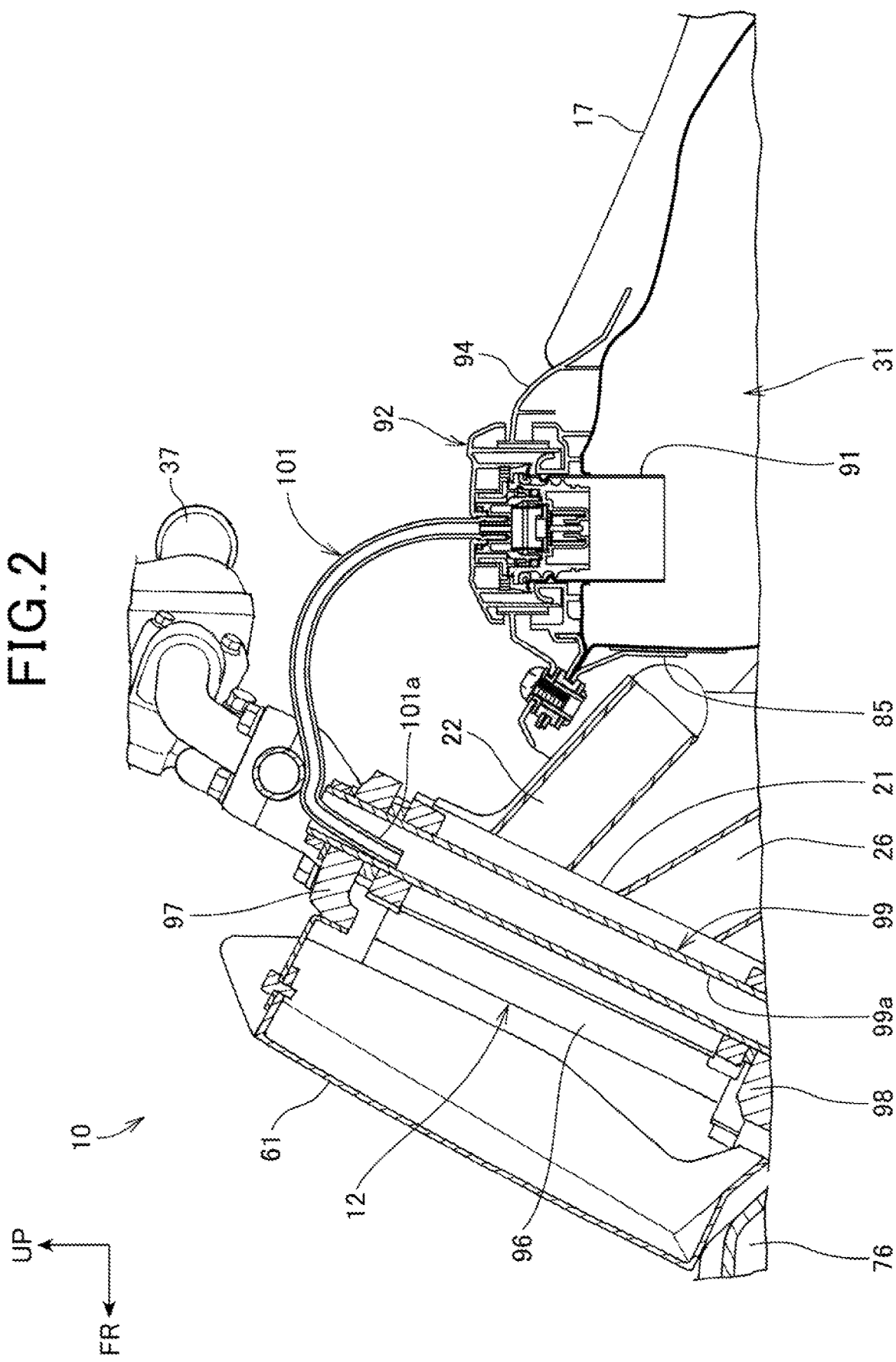
FIG. 2 is a cross-sectional view showing an upper front part of the motorcycle.

FIG. 2 is a cross-sectional view showing an upper front part of the motorcycle 10, and shows a cross section cut along a plane extending forward, backward and perpendicularly through a center of the motorcycle 10 in a vehicle width direction.

The fuel tank 31 has a front end fixed to the main frame 22 via a tank bracket 85. The fuel tank 31 has an upper front part provided with a fuel supply port 91, and the fuel supply port 91 is closed with a fuel cap 92. Furthermore, the fuel supply port 91 of the fuel tank 31 has a periphery covered with a tank cover 94. The fuel tank 31 has a rear part that supports a front part of the seat 17.

The front fork 12 comprises a pair of right and left fork tubes 96, a top bridge 97 that couples upper parts of the right and left fork tubes 96, a bottom bridge 98, and stem pipes 99 disposed across the top bridge 97 and the bottom bridge 98, respectively.

The fork tube 96 is a telescopic shock absorber that forms a front suspension. The top bridge 97 supports the bar handle 37. The stem pipe 99 is inserted in the head pipe 21 and rotatably supported by the head pipe 21. The stem pipe 99 has a hollow 99a in which a tip 101a of a breather tube 101 extending from the fuel cap 92 is inserted. The hollow 99a of the stem pipe 99 is a space that communicates with a space outside the vehicle body and can take in outside air.

The tip 101a of the breather tube 101 is formed as an open end, and gas exit and entrance occur between an interior of the fuel tank 31 and the hollow 99a of the stem pipe 99 via the tip 101a in accordance with pressure change in the fuel tank 31.

As described above, since the tip 101a that is the open end of the breather tube 101 is inserted in the hollow 99a of the stem pipe 99, mud, water, dust or the like can be further inhibited from entering the fuel tank 31, and a fuel leakage path can be further restricted when the vehicle falls.

Figure 3:
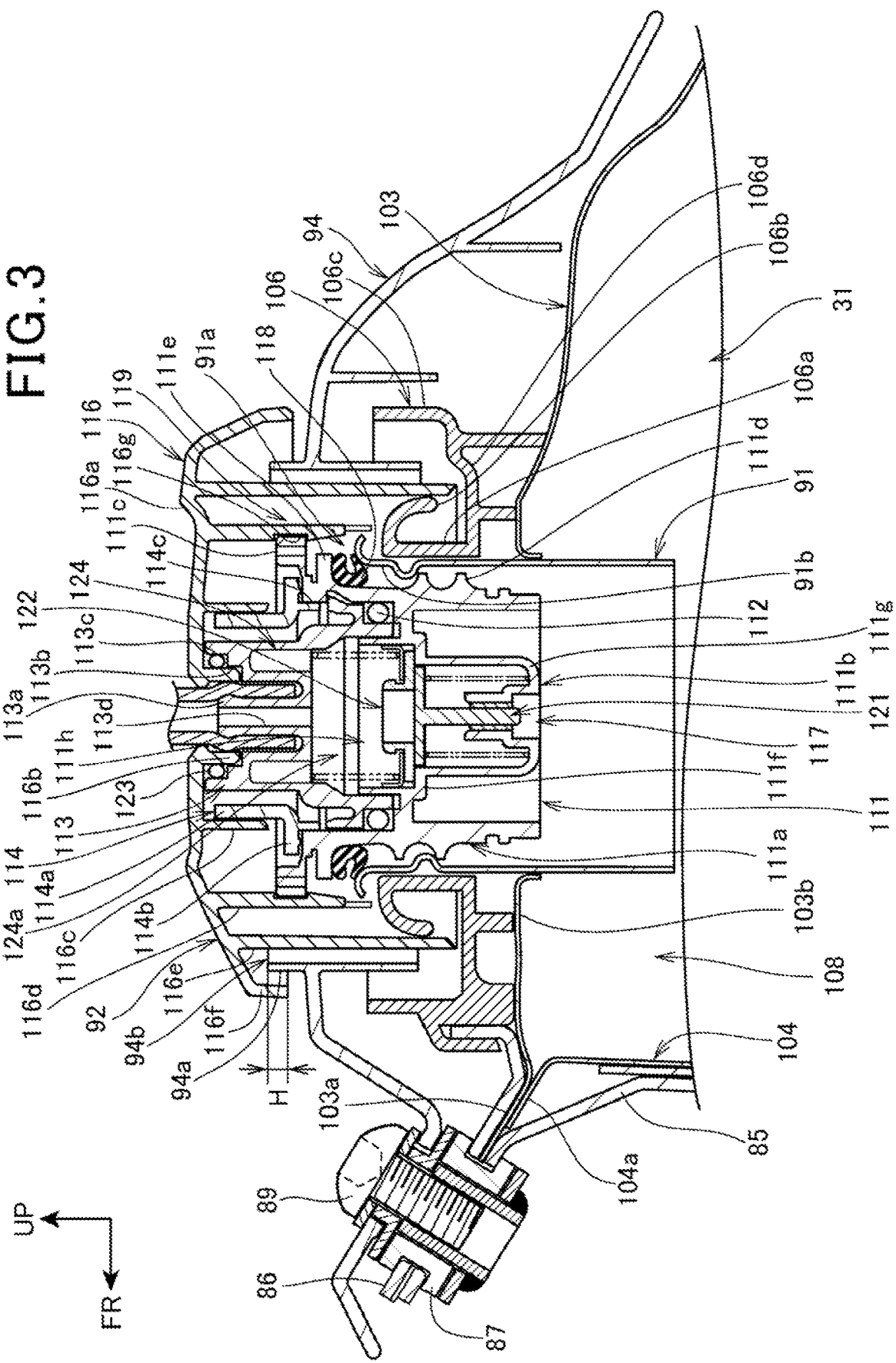
FIG. 3 is a main part enlarged view showing a fuel supply port of FIG. 2 and a surrounding of the port.

FIG. 3 is a main part enlarged view showing the fuel supply port 91 of FIG. 2 and a surrounding of the port.

The fuel tank 31 comprises a tank upper half body 103, a tank lower half body 104, the fuel supply port 91, the fuel cap 92, a fuel tray 106, and the tank cover 94.

The tank upper half body 103 and the tank lower half body 104 have peripheral edges in which an upper flange 103a and a lower flange 104a are formed, respectively, and the upper flange 103a and the lower flange 104a are joined to form a tank body 108 as a container. The fuel supply port 91 is a cylindrical member, and is attached to an upper flat part 103b of the tank upper half body 103 to extend through the upper flat part 103b in an up-down direction. The fuel supply port 91 has an upper opening 91a under which an internal thread 91b is formed.

The upper flange 103a of the tank upper half body 103 extends diagonally upward and forward, and is fastened together with the tank bracket 85 and a reinforcing plate 86 via an elastic member 87 with a bolt 89. Furthermore, the tank bracket 85 is also fastened together with a front end of the tank cover 94 with the bolt 89.

The fuel cap 92 comprises a cap body 111, an O-ring 112, a retainer 113, a ratchet body 114, a cap outer 116, a pressure adjusting device 117, and a seal member 118.

The cap body 111 integrally comprises a cylindrical portion 111a screwed into the fuel supply port 91, a valve support portion 111b formed integrally on an inner side of the cylindrical portion 111a, and an annular ratchet engaged portion 111c formed at an upper end of the cylindrical portion 111a. The cylindrical portion 111a has an external thread 111d formed in thread connection with the internal thread 91b of the fuel supply port 91. Furthermore, a flange 111e is formed on the cylindrical portion 111a of the cap body 111, and the seal member 118 is attached to a lower surface of the flange 111e to seal a space between the surface and the upper opening 91a of the fuel supply port 91.

The retainer 113 is a cup-shaped member, and is engaged with and thereby attached to an inner surface of the cylindrical portion 111a of the cap body 111. A space between the cap body 111 and the retainer 113 is sealed with the O-ring 112. The cap body 111 and the retainer 113 form a housing 124.

The retainer 113 has a bottom portion 113e (see FIG. 4) provided with a tube connection port 113a to which the breather tube 101 is connected, a fitting hole 113b in which the cap outer 116 fits, and an O-ring mounting hole 113c in which an O-ring 123 is mounted.

In the tube connection port 113a, a communication hole 113d is made so that a space 124a in the housing 124 communicates with an interior of the breather tube 101.

The ratchet body 114 comprises a cylindrical portion 114a attached to the cap outer 116, and a flange portion 114b extending radially outward from one end of the cylindrical portion 114a.

The flange portion 114b has an outer peripheral portion in which a plurality of claw portions (not shown) are formed to be locked with the ratchet engaged portion 111c in a direction (e.g., a counterclockwise direction) in which the fuel cap 92 is turned when opened. The flange portion 114b including the plurality of claw portions and the ratchet engaged portion 111c form a ratchet structure.

The above plurality of claw portions are locked with the ratchet engaged portion 111c, to transmit, to the cap body 111, a rotational force applied to the cap outer 116, so that the cap body 111 can be rotated. Note that the plurality of claw portions of the flange portion 114b are not locked with the ratchet engaged portion 111c in a direction (e.g., a clockwise direction) in which the fuel cap 92 is turned when closed. Consequently, the ratchet body 114 can idle relative to the ratchet engaged portion 111c.

The flange portion 114b has a lower portion integrally formed with a cylindrical portion 114c extending downward. The cylindrical portion 114c is rotatably supported at an upper end of the cylindrical portion 111a of the cap body 111.

The cap outer 116 is fitted in a part of the cap body 111 and thereby attached. The cap outer 116 comprises a plurality of peripheral walls 116b, 116c, 116d, 116e and 116f projecting integrally from an inner surface of an outer wall 116a, in order from a center of the outer wall 116a.

The innermost peripheral wall 116b fits in the fitting hole 113b formed in the bottom portion 113e of the retainer 113. The O-ring 123 is disposed in a space formed by the peripheral wall 116b and the O-ring mounting hole 113c of the retainer 113, and a space between the peripheral wall 116b and the retainer 113 is sealed. The cylindrical portion 114a of the ratchet body 114 is attached to the peripheral wall 116c.

The peripheral wall 116d has an inner peripheral surface in which an annular engagement recess 116g is formed, and the engagement recess 116g fits in the ratchet engaged portion 111c to form a torque regulating portion 119 that regulates a torque when the fuel cap 92 is turned and closed. The torque regulating portion 119 prevents the cap outer 116 from idling relative to the cap body 111 and prevents the cap body 111 from being fastened to the fuel supply port 91 in excess of a predetermined fastening torque, when the predetermined fastening torque is reached in closing the fuel cap 92.

The peripheral wall 116e has an inner peripheral surface in contact with the fuel tray 106.

The outermost peripheral wall 116f covers a part of the tank cover 94 from a radially outer side.

The fuel tray 106 comprises an inner peripheral wall 106a formed to surround an upper portion of the fuel supply port 91, an outer peripheral wall 106c that surrounds a radially outer side of the inner peripheral wall 106a, and a bottom wall 106d that integrally connects the inner peripheral wall 106a and the outer peripheral wall 106c.

The inner peripheral wall 106a has a tip integrally comprising a dust seal portion 106b extending radially outward. The dust seal portion 106b in an elastically deformed state is pressed onto the inner peripheral surface of the peripheral wall 116e of the cap outer 116. Consequently, the dust seal portion 106b can seal a space between the fuel tray 106 and the cap outer 116.

The tank cover 94 comprises a cylindrical portion 94a that surrounds a radially outer side of the peripheral wall 116e of the cap outer 116. An opening 94b of an upper edge of the cylindrical portion 94a is covered with the outermost peripheral wall 116f of the cap outer 116 from the radially outer side.

A lower edge of the peripheral wall 116f is lower as much as a height H than the upper edge of the cylindrical portion 94a.

Thus, the lower edge of the peripheral wall 116f is located below the upper edge of the cylindrical portion 94a. Consequently, the peripheral wall 116f and the cylindrical portion 94a can form the labyrinth structure, thereby making it difficult for the mud, water, dust or the like to enter the tank cover 94 from outside the vehicle body.

Furthermore, the fuel tray 106 is provided around the fuel supply port 91 of the fuel tank 31, and the inner peripheral wall 106a is formed as a tray peripheral wall in the fuel tray 106 to surround the fuel supply port 91. The dust seal portion 106b extending radially outward from the inner peripheral wall 106a fits in the inner peripheral surface of the peripheral wall 116e as the outer peripheral wall formed in the cap outer 116.

According to this configuration, the dust seal portion 106b of the fuel tray 106 is fitted in the peripheral wall 116e of the cap outer 116. Consequently, it is possible to prevent permeation of the mud, water, dust or the like into the fuel cap 92, and it is possible to make it difficult for the mud, water, dust or the like to enter the fuel tank 31 during opening/ closing of the fuel cap 92.

Additionally, the fuel tank 31 comprises the tank cover 94 that covers a periphery of the fuel supply port 91, and the cylindrical portion 94a in which the peripheral wall 116e of the cap outer 116 is inserted is formed in the tank cover 94. The cylindrical portion 94a is formed on a radially inner side of the peripheral wall 116f as an outermost peripheral portion of the cap outer 116, and the lower edge of the peripheral wall 116f of the cap outer 116 is located below the upper edge of the cylindrical portion 94a.

According to this configuration, the peripheral wall 116f of the cap outer 116 and the cylindrical portion 94a of the tank cover 94 can form the labyrinth structure. Consequently, it is possible to make it difficult for the mud, water, dust or the like to enter the fuel tank 31.

Figure 4:
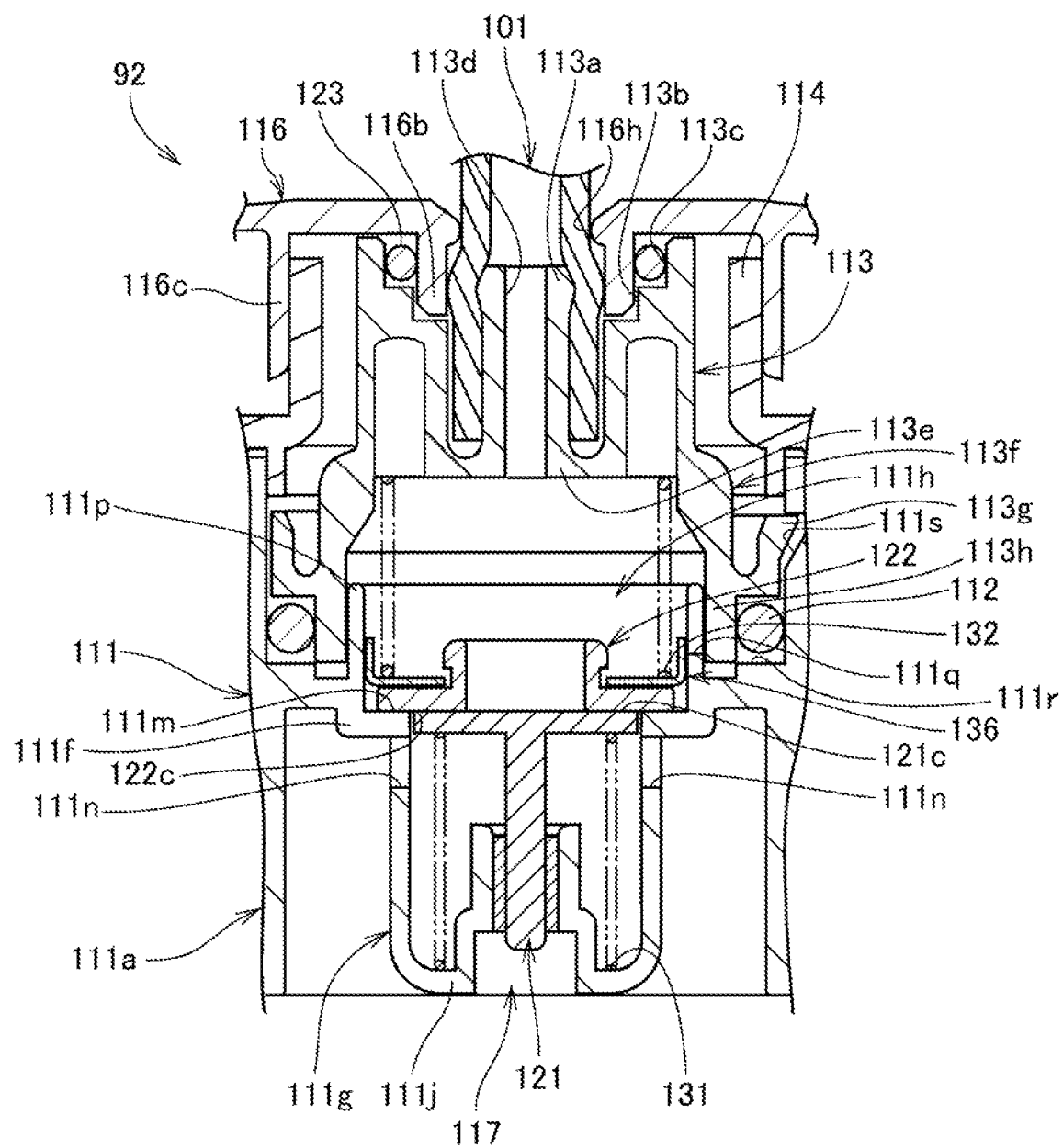
FIG. 4 is a main part enlarged view of FIG. 3.

FIG. 4 is a main part enlarged view of FIG. 3.

The valve support portion 111b of the cap body 111 comprises an intermediate wall 111f provided in an intermediate portion in the up-down direction, a lower accommodating portion 111g formed in a lower portion of the intermediate wall 111f, and an upper accommodating portion 111h formed in an upper portion of the intermediate wall 111f.

The cylindrical portion 111a of the cap body 111 comprises an annular recess 111r formed on a radially outer side of the upper accommodating portion 111h, and an engaged recess 111s formed in an upper inner surface of the annular recess 111r.

The retainer 113 includes a peripheral wall portion 113f raised from the bottom portion 113e and integrally comprising an engagement portion 113g projecting radially outward. The peripheral wall portion 113f is inserted in the annular recess 111r of the cap outer 116, and the engagement portion 113g is engaged with the engaged recess 111s of the cap outer 116. The O-ring 112 is inserted in a space between a tip 113h of the peripheral wall portion 113f and the cylindrical portion 111a of the cap outer 116, and the space between the cap body 111 and the retainer 113 is sealed.

An annular inward projecting portion 116h projecting radially inward is integrally formed with an upper portion of an inner peripheral surface of the peripheral wall 116b of the cap outer 116. The inward projecting portion 116h is a portion that presses an outer peripheral surface of the breather tube 101 connected to the tube connection port 113a of the retainer 113. A space between the breather tube 101 and the cap outer 116 is sealed with the inward projecting portion 116h.

The pressure adjusting device 117 comprises a lower valve 121, an upper valve 122 and a sliding piece 136.

The lower valve 121 is disposed in the lower accommodating portion 111g so that the valve is movable in the up-down direction. A lower compression coil spring 131 is provided between the lower valve 121 and a bottom wall 111j, to urge the lower valve 121 upward.

The upper valve 122 is disposed in the upper accommodating portion 111h so that the valve is movable in the up-down direction. An upper compression coil spring 132 is provided between the sliding piece 136 and the bottom portion 113e of the retainer 113, to urge the upper valve 122 downward.

As described above, the cap body 111 and the retainer 113 attached to the cap body 111 form the housing 124. The space 124a is formed as a hermetically closed space in the housing 124. The breather tube 101 is connected directly to the retainer 113, and a space between the retainer 113 and the cap body 111 is sealed via the O-ring 112.

According to this configuration, the space between the retainer 113 and the cap body 111 is sealed, so that the hermetically closed space can be easily formed in the housing 124, and gas leakage from the housing 124 itself to an exterior of the fuel tank 31 can be prevented.

As shown in FIG. 3 and FIG. 4, the fuel cap 92 comprises the cap body 111 mounted to the fuel supply port 91 of the fuel tank 31, and the pressure adjusting device 117 provided in the cap body 111 to adjust the pressure in the fuel tank 31. In the fuel cap 92, the space 124a is formed as the hermetically closed space in which the pressure adjusting device 117 is accommodated, and the space 124a communicates with the exterior of the fuel tank 31 via the breather tube 101.

According to this configuration, gases (an evaporative fuel in the fuel tank 31 and air in the stem pipe 99 (see FIG. 2)) can exit and enter the fuel tank 31 only through the breather tube 101 to adjust the pressure in the fuel tank 31. This can make it difficult for the mud, water, dust or the like to enter the fuel tank 31, and can restrict the fuel leakage path when the vehicle falls.

The above described embodiment merely illustrates one aspect of the present invention, and can be optionally modified and applied without departing from the gist of the present invention.

For example, in the above embodiment, as shown in FIG. 4, the O-ring 112 is provided between the cap body 111 and the retainer 113 to acquire a seal property of the housing 124, but this example is not restrictive. The cap body 111 and the retainer 113 may be coupled by welding or sealing to acquire the seal property of the housing 124.

The present invention is not limited to the application to the motorcycle 10, and is also applicable to a saddle vehicle including a vehicle other than the motorcycle 10. Note that the saddle vehicle is a vehicle including a general vehicle to ride across a vehicle body, and including not only the motorcycle (also including a motorbike) but also a three-wheeled vehicle or a four-wheeled vehicle classified as an all-terrain vehicle (ATV).

REFERENCE SIGNS LIST 10 motorcycle
31 fuel tank
91 fuel supply port
92 fuel cap
94 tank cover
94a cylindrical portion
99 stem pipe
106 fuel tray
106a inner peripheral wall (a tray peripheral wall)
106b dust seal portion
111 cap body
113 retainer
116e peripheral wall (an outer peripheral wall)
116f peripheral wall (an outermost peripheral portion)
117 pressure adjusting device
124 housing
124a space in the housing (a hermetically closed space)

The invention claimed is:

1. A motorcycle comprising a fuel tank structure having:
a fuel tank that is fixed to a main frame; and
a fuel cap that closes a fuel supply port of the fuel tank, where
the motorcycle comprises a front fork including:
right and left fork tubes;
a top bridge and a bottom bridge that couple the right and left fork tubes; and
a stem pipe that is disposed between the top bridge and the bottom bridge, wherein
the fuel cap comprises a cap body, a retainer, and a pressure adjusting valve that adjusts a pressure in the fuel tank,
the cap body comprises a cylindrical portion that is screwed into the fuel supply port,
the retainer is a cup-shaped member and is engaged with, and thereby attached to, an inner surface of the cylindrical portion of the cap body,
a space between the cap body and the retainer is sealed with an O-ring whereby inside a housing formed by the cap body and the retainer is formed as a hermetically closed space,
the pressure adjusting valve is accommodated in the hermetically closed space,
the retainer comprises a tube connection port to which a breather tube is connected, and a communication hole that communicates an interior of the breather tube connected to the tube connection port with the hermetically closed space inside the housing, the breather tube has an open end inserted in a hollow of the stem pipe.

2. The motorcycle according to claim 1, wherein a cap outer is fitted in, and thereby attached to, an outer side of the cap body, a fuel tray is provided around the fuel supply port of the fuel tank, a tray peripheral wall is formed in the fuel tray to surround the fuel supply port, and a dust seal portion extending radially outward from the tray peripheral wall is fitted in an inner peripheral surface of an outer peripheral wall formed in the cap outer.

3. The motorcycle according to claim 2, wherein the fuel tank comprises a tank cover that covers a periphery of the fuel supply port, a cylindrical portion in which the outer peripheral wall of the cap outer is inserted is formed in the tank cover, the cylindrical portion is formed on a radially inner side of an outermost peripheral portion of the cap outer, and a lower edge of the outermost peripheral portion of the cap outer is located below an upper edge of the cylindrical portion.

* * * * *